United States Patent [19]

Yamaguchi

[11] Patent Number: 5,072,119
[45] Date of Patent: Dec. 10, 1991

[54] RADIATION IMAGE READ-OUT APPARATUS AND ERASING APPARATUS

[75] Inventor: Akira Yamaguchi, Kanagawa, Japan

[73] Assignee: Fuji Photo Film Co., Ltd., Kanagawa, Japan

[21] Appl. No.: 686,382

[22] Filed: Apr. 17, 1991

[30] Foreign Application Priority Data

Apr. 18, 1990 [JP] Japan .................................. 2-102017
Apr. 18, 1990 [JP] Japan .................................. 2-102018

[51] Int. Cl.⁵ ........................ G03B 42/00; G03C 5/16
[52] U.S. Cl. ............................................... 250/327.2
[58] Field of Search ................. 250/327.2 D, 327.2 E, 250/327.2 F, 327.2 G, 327.2 H, 327.2 L, 327.2 J, 327.2 K, 484.1 B

[56] References Cited

U.S. PATENT DOCUMENTS

| | | |
|---|---|---|
| 4,258,264 | 3/1981 | Kotera et al. . |
| 4,276,473 | 6/1981 | Kato et al. . |
| 4,315,318 | 2/1982 | Kato et al. . |
| 4,387,428 | 6/1983 | Ishida et al. . |
| 4,410,799 | 10/1983 | Okamoto ........................... 250/327.2 |
| 4,584,482 | 4/1986 | Suzuki et al. ................ 250/327.2 X |
| 4,629,891 | 12/1986 | Nakajima et al. ................. 250/327.2 |
| 4,687,937 | 8/1987 | Aagano et al. . |
| 4,757,199 | 7/1988 | Horikawa ......................... 250/327.2 |
| 4,816,678 | 3/1989 | Takasaki ........................... 250/327.2 |
| 4,857,733 | 8/1989 | Sadtome et al. .................. 250/327.2 |
| 4,906,847 | 3/1990 | Nakajima et al. ................. 250/327.2 |
| 4,952,806 | 8/1990 | Mori .................................. 250/327.2 |

FOREIGN PATENT DOCUMENTS 56-11395 2/1981 Japan .

*Primary Examiner*—Janice A. Howell
*Assistant Examiner*—Edward J. Glick
*Attorney, Agent, or Firm*—Sughrue, Mion, Zinn, Macpeak & Seas

[57] ABSTRACT

A radiation image read-out apparatus comprising:scanner for scanning stimulable phosphor sheets with a beam of stimulating light, read-out device for detecting light emitted from the stimulable phosphor sheet and producing an electric image signal, sheet discriminator for discriminating between different types of phosphor sheets, stimulating light regulator for regulating the amount of stimulating light projected onto the stimulable phosphor sheet per unit area thereof during scanning and/or gain regulator for regulating the conversion gain of the read-out device, and control apparatus responsive to the output of the sheet discriminator for controlling the stimulating light regulator and/or the gain regulator to cause the read-out device to produce identical image signals in response to different amounts of light emitted by different types of phosphor sheets having radiation images recorded thereon under the same conditions. A radiation image read-out and/or erasing apparatus comprising:energy level detector for detecting the energy level stored by the stimulable phosphor sheet at the time of read-out and/or sheet discriminator for discriminating between different types of phosphor sheets, and control apparatus responsive to the output of the energy level detector and/or the sheet discriminator for controlling the amount of erasing light projected onto the stimulable phosphor sheet.

5 Claims, 4 Drawing Sheets

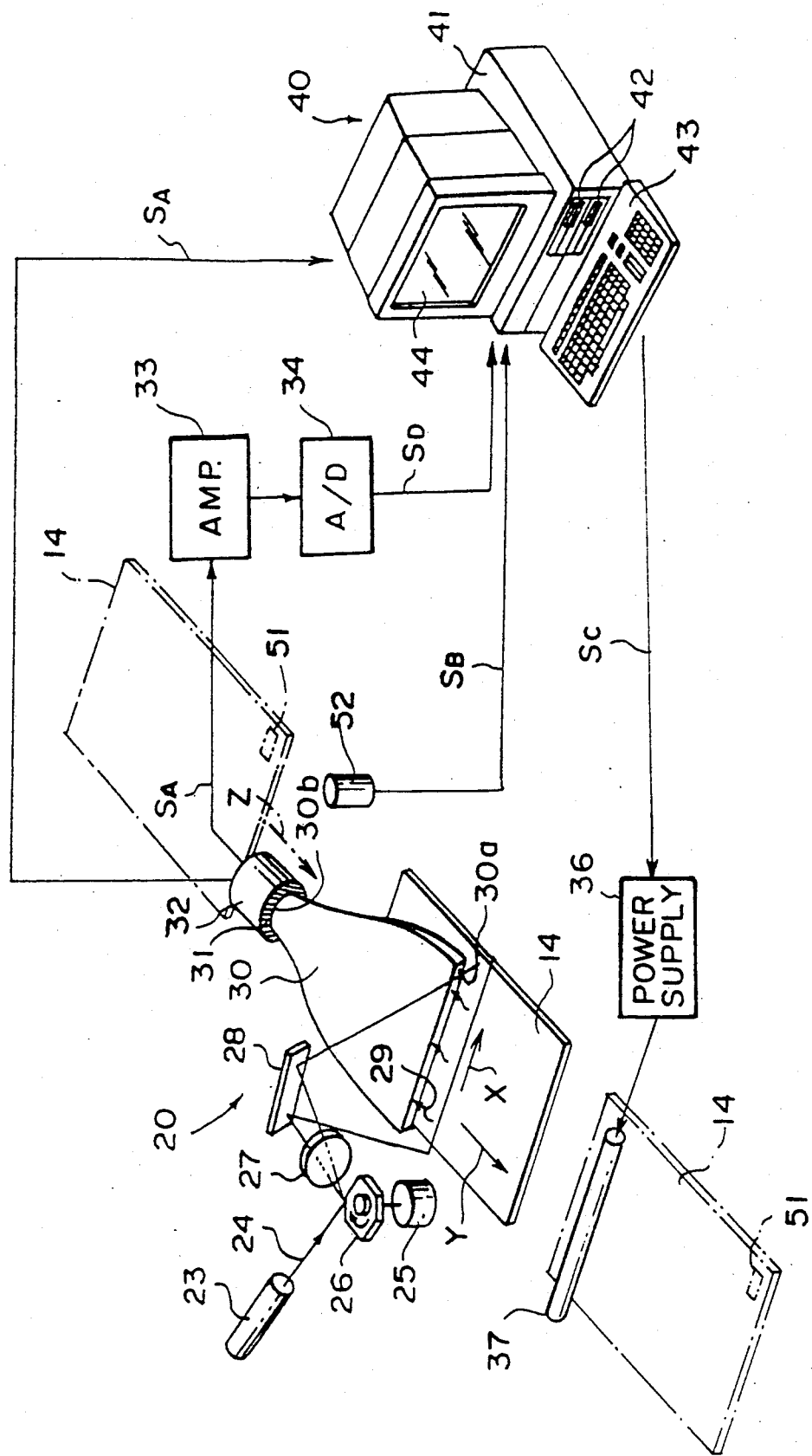

RADIATION IMAGE READ-OUT APPARATUS AND ERASING APPARATUS

BACKGROUND OF THE INVENTION

1. Field of the Invention

This invention relates to a radiation image readout apparatus which detects the light emitted by a stimulable phosphor sheet on which a radiation image is recorded to therby obtain an image signal representing the radiation image. It further relates to an erasing apparatus for erasing the radiation energy remaining on the stimulable phosphor sheet after read-out of the radiation image has been completed.

2. Description of the Prior Art

When certain kinds of phosphors are exposed to radiation such as X-rays, α-rays, β-rays, γ-rays, cathode rays or ultraviolet rays, they store part of the energy of the radiation. Then, when the phosphor which has been exposed to the radiation is exposed to stimulating rays such as visible light, light is emitted by the phosphor in proportion to the amount of energy stored during exposure to the radiation. A phosphor exhibiting such properties is referred to as a stimulable phosphor. As disclosed in Japanese Unexamined Patent Publication No. 56(1981)-11395, and U.S. Pat. Nos. 4,258,264, 4,315,318, 4,387,428 and 4,276,473, it has been proposed to use stimulable phosphors in radiation image recording and reproducing systems. Specifically, a sheet provided with a layer of the stimulable phosphor (hereinafter referred to as a stimulable phosphor sheet) is first exposed to radiation which has passed through an object such as the human body in order to store a radiation image of the object thereon, and is then scanned with stimulating rays, such as a laser beam, which cause it to emit light in proportion to the amount of energy stored during exposure to the radiation. The light emitted by the stimulable phosphor sheet upon stimulation thereof is photoelectrically detected and converted into an electric image signal, which is used when the radiation image of the object is reproduced as a visible image on a recording material such a photographic film, a display device such as a cathode ray tube (CRT), or the like.

The radiation image recording and reproducing system using a stimulable phosphor sheet is advantageous over conventional radiography using a silver halide photographic material in that the image can be recorded over a very wide range (latitude) of radiation exposure. More specifically, since the amount of light emitted upon stimulation after the radiation energy is stored on the stimulable phosphor varies over a very wide range in proportion to the amount of energy stored thereon, it is possible to obtain an image which is unaffected by variations in the amount of exposure of the stimulable phosphor to the radiation, even when the amount of exposure varies greatly depending on the imaging conditions, by reading out the emitted light with a photoelectric conversion means at an appropriate read-out gain and converting it to an electric image signal to reproduce a visible image on a recording medium such as photographic film or on a display device such as a CRT.

In such systems, there are sometimes employed different types of stimulable phosphor sheets and, as a result, two sheets exposed to the same amount of radiation energy at the time of image recording may be found to emit different amounts of light during read-out even when scanned with stimulating rays under the same conditions. Thus where no particular precautions are taken regarding the read-out of different types of stimulable phosphor sheets and read-out is conducted under identical conditions for all of the sheets regardless of type, it is likely that overflow of the image signal will make it impossible to obtain an image signal carrying accurate radiation image information. The density of the visible image reproduced using such an image signal is apt to be either too high or too low. (This also affects the accuracy of the reproduced image in the case where it is displayed on a CRT or the like.) The reproduced image is thus troublesome to examine.

The radiation image read-out in the aforesaid manner generally does not release all of the radiation image energy stored by the stimulable phosphor sheet and the sheet usually continues to carry a residual image after completion of read-out. For restoring the stimulable phosphor sheet to a usable state, therefore, the read-out sheet is exposed to erasing light for discharging the remaining radiation energy (erasing the residual image).

There is a high probability that a given system will use different types of stimulable phosphor sheets with different degrees of erasability. Erasability is expressed in terms of the amount of erasing light required to erase the residual image of a stimulable phosphor sheet that has been exposed to a specified amount of radiation energy and thereafter read out under specified conditions. Stimulable phosphor sheets having different erasabilities require different amounts of residual image erasing light even when they are exposed to the same amount of radiation energy and read-out under the same conditions.

One solution to this problem would be to set the amount of erasing light to that appropriate for the type of stimulable phosphor sheet requiring the largest amount of erasing light (where the amount of erasing light equals the product of the amount of light emitted by the erasing light source per unit time and the period of time that the stimulable phosphor sheet is exposed to the erasing light). Since some types of stimulable phosphor sheets would be completely erased by exposure to a smaller amount of erasing light, however, this method would frequently waste electric power by operating the erasing light source at a higher output or for a longer time than necessary. It would also prolong the operation cycle time in a system that circulates one or more stimulable phosphor sheets for repeated use.

SUMMARY OF THE INVENTION

One object of the present invention is to provide a radiation image read-out apparatus able to obtain image signals of the same level from different types of stimulable phosphor sheets recorded with radiation images under the same conditions.

Another object of the present invention is to provide a radiation image read-out apparatus which eliminates waste of electric power in erasing different types of stimulable phosphor sheets and enables the operation cycle to be shortened.

For achieving these objects, the present invention provides a first radiation image read-out apparatus comprising:

scanning means for two-dimensionally scanning stimulable phosphor sheets each carrying a radiation image thereon with a beam of stimulating light, read-out means for photoelectrically detecting light emitted from the stimulable phosphor sheet scanned with the stimulating light and producing an electric image signal carrying the radiation image, means for discriminating different types of stimulable phosphor sheets, means for regulating the amount of the stimulating light projected onto the stimulable phosphor sheet per unit area thereof during scanning with the beam of stimulating light, and control means responsive to the output of the stimulable phosphor sheet discriminating means for controlling the light amount regulation means to cause different types of stimulable phosphor sheets having radiation images recorded thereon under the same conditions to emit the same amount of light.

The invention also provides a second radiation image read-out apparatus comprising:

scanning means for two-dimensionally scanning stimulable phosphor sheets each carrying a radiation image thereon with a beam of stimulating light, read-out means for photoelectrically detecting light emitted from the stimulable phosphor sheet scanned with the stimulating light and producing an electric image signal carrying the radiation image, means for discriminating different types of stimulable phosphor sheets, means for regulating the photoelectric conversion gain of the read-out means, and control means responsive to the output of the stimulable phosphor sheet discriminating means for controlling the photoelectric conversion gain regulation means to cause the read-out means to produce identical image signals in response to different amounts of light emitted by different types of stimulable phosphor sheets having radiation images recorded thereon under the same conditions.

The invention further provides a third radiation image read-out apparatus comprising:

scanning means for two-dimensionally scanning stimulable phosphor sheets each carrying a radiation image thereon with a beam of stimulating light, read-out means for photoelectrically detecting light emitted from the stimulable phosphor sheet scanned with the stimulating light and producing an electric image signal carrying the radiation image, means for discriminating different types of stimulable phosphor sheets, means for regulating the amount of the stimulating light projected onto the stimulable phosphor sheet per unit area thereof during scanning with the beam of stimulating light, means for regulating the photoelectric conversion gain of the read-out means, and control means responsive to the output of the stimulable phosphor sheet discriminating means for controlling the light amount regulation means and the photoelectric conversion gain regulation means to cause the read-out means to produce identical image signals in response to different amounts of light emitted by different types of stimulable phosphor sheets having radiation images recorded thereon under the same conditions.

When the amount of stimulating light projected onto the stimulable phosphor sheet per unit area is varied, the amount of light emitted by the sheet also varies proportionally.

The first radiation image read-out apparatus according to the invention is thus provided with a means for discriminating different types of stimulable phosphor sheets, means for regulating the amount of the stimulating light projected onto the stimulable phosphor sheet per unit area thereof during scanning with the beam of stimulating light, and control means responsive to the output of the stimulable phosphor sheet discriminating means for controlling the light amount regulation means to cause different types of stimulable phosphor sheets having radiation images recorded thereon under the same conditions to emit the same amount of light.

Any of various means can be used for regulating the amount of stimulating light projected onto the stimulable phosphor sheet per unit area. Specifically, it is possible to regulate the luminous energy of the stimulating light beam per se or to regulate the beam scanning speed so as to vary the length of time that any given point on the sheet is exposed to the beam. The present invention puts no restriction on the specific type of light amount regulation means employed and any means capable of regulating the amount of light projected onto the stimulable phosphor sheet per unit area suffices.

Instead of regulating the amount of light projected onto the stimulable phosphor sheets per unit area, it is alternately possible to obtain image signals of the same level by using different conversion gains for photoelectrically converting the light emitted in different amounts by different types of sheets.

The radiation image read-out apparatus according to the second aspect of the invention is based on this principle. Thus for enabling it to produce signals of the same level irrespective of the type of stimulable phosphor sheet, it is provided with means for discriminating different types of stimulable phosphor sheets, means for regulating the photoelectric conversion gain of the readout means for photoelectrically detecting light emitted from the stimulable phosphor sheet and producing an electric image signal, and control means responsive to the output of the stimulable phosphor sheet discriminating means for controlling the photoelectric conversion gain regulation means to cause the read-out means to produce identical image signals in response to different amounts of light emitted by different types of stimulable phosphor sheets having radiation images recorded thereon under the same conditions.

The radiation image read-out apparatus according to the third aspect of the invention is provided with both the means for regulating the amount of the stimulating light projected onto the stimulable phosphor sheet per unit area thereof and the means for regulating the photoelectric conversion gain of the read-out means, and both are controlled for ensuring production of an image signal of the same level irrespective of the type of the stimulable phosphor sheet from which the radiation image is being read. With the radiation image read-out apparatus according to this arrangement, it is possible, for example, to first control the light amount regulation means so that the amounts of light emitted by different types of stimulable phosphor sheets become almost identical and then to carry out fine adjustment by regulating the photoelectric conversion gain.

The first to third radiation image read-out apparatuses according to the invention comprise means for discriminating different types of stimulable phosphor sheets and either or both of means for regulating the amount of the stimulating light projected onto the stimulable phosphor sheet per unit area and means for regulating the photoelectric conversion gain of the readout means. As the light amount regulating means and/or the photoelectric conversion gain regulating means are controlled in response to the output from the discrimination means, it becomes possible to obtain identical image signals in response the light emitted by different types of stimulable phosphor sheets having radiation images recorded thereon under the same conditions. Each of the apparatuses is thus able to conduct good quality read-out with respect to different types of stimulable phosphor sheets.

The stimulable phosphor sheet erasing apparatus according to the present invention, which is arranged for erasing any residual radiation image present on a stimulable phosphor sheet by projecting erasing light onto the sheet, is characterized in that it comprises means for discriminating different types of stimulable phosphor sheets differing in erasability and means responsive to the output of the discriminating means for controlling the amount of the erasing light projected onto the stimulable phosphor sheet thereof.

Further, the present invention provides a fourth radiation image read-out apparatus comprising:

scanning means for two-dimensionally scanning stimulable phosphor sheets each carrying a radiation image thereon with a beam of stimulating light, read-out means for photoelectrically detecting light emitted from the stimulable phosphor sheet scanned with the stimulating light and producing an electric image signal carrying the radiation image, means for erasing any residual radiation image present on the stimulable phosphor sheet by projecting erasing light onto the portion of the stimulable phosphor sheet for which read-out has been completed, means for discriminating different types of stimulable phosphor sheets differing in erasability, means for detecting the radiation energy level stored by the stimulable phosphor sheet at the time the read-out means photoelectrically detects the light emitted thereby, and means responsive to the output of the discriminating means and the output of the radiation energy level detecting means for controlling the amount of the erasing light projected onto the stimulable phosphor sheet thereof.

As the stimulable phosphor sheet erasing apparatus and the fourth radiation image read-out apparatus according to the invention are respectively equipped with means which, in response to the type of stimulable phosphor sheet discriminated from among a plurality of sheet types differing in erasability, controls the amount of the erasing light projected onto the stimulable phosphor sheet thereof, these apparatuses eliminate waste of electric power and enable an increase in the processing rate per unit time.

BRIEF DESCRIPTION OF THE DRAWINGS

FIG. 4 is a perspective view showing an X-ray image read-out apparatus according to another embodiment of the present invention.

DESCRIPTION OF THE PREFERRED EMBODIMENTS

The present invention will hereinbelow be described in further detail with reference to the accompanying drawings.

Figure 1:
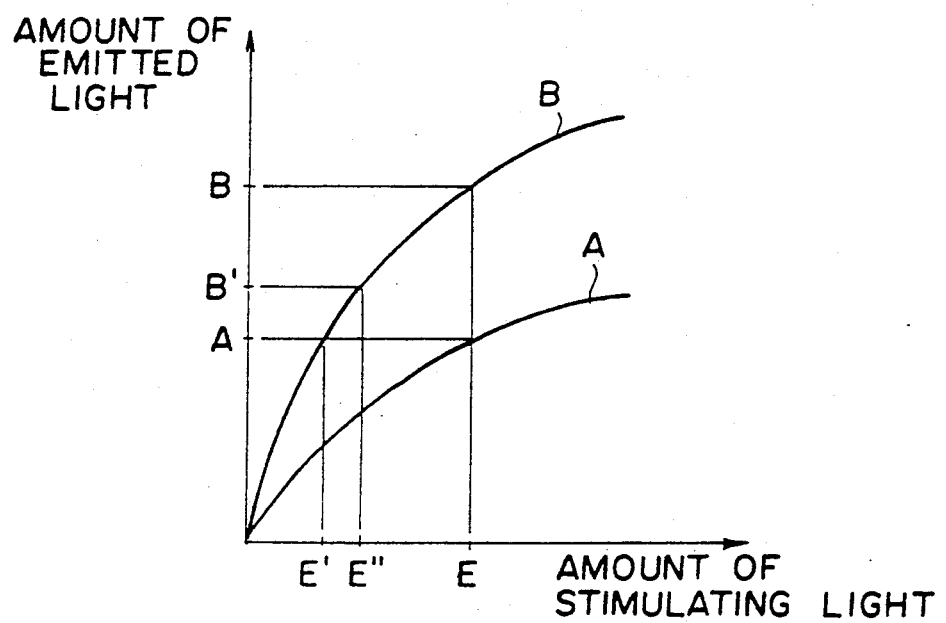
FIG. 1 is a graph showing the relationship between the amount of stimulating light projected per unit area onto different types of stimulable phosphor sheets which had in advance been exposed to identical amounts of X-ray energy and the amount of light emitted by the stimulable phosphor sheets.

In FIG. 1, reference numeral 14 designates a stimulable phosphor sheet on which an X-ray image has been recorded using an X-ray image recording unit (not shown). The stimulable phosphor sheet 14 having the X-ray image recorded thereon is conveyed in the direction of the arrow Z in the figure to be set at a prescribed position in an X-ray image read-out section 20. The X-ray image read-out section 20 is equipped with a bar code reader 52 for reading a bar code 51 affixed to the stimulable phosphor sheet 14. As the stimulable phosphor sheet 14 is being conveyed toward its prescribed position in the X-ray image read-out section 20, the information represented by the bar code 51 is read by the bar code reader 52. The type of the stimulable phosphor sheet 14 is discriminated from this information. After the stimulable phosphor sheet 14 has been set at the prescribed position, it is conveyed in the direction of the arrow Y (the sub-scanning direction) by a sheet conveyance means. On the other hand, a laser beam 24 emitted by a laser beam source 23 is deflected by reflection from a rotating polygonal mirror 26 driven at high speed in the direction of the arrow by a motor 25. The so-deflected beam passes through an $f\theta$ lens or other such convergent lens 27 and then has its optical path changed by a mirror 28 so as to scan the stimulable phosphor sheet 14 in the direction of the arrow X, namely in the main scanning direction which lies substantially perpendicular to the sub-scanning direction indicated by the arrow Y. The portion of the stimulable phosphor sheet 14 irradiated by the laser beam 24 emits light 29 in proportion to the stored image information. The emitted light 29 enters a light guide 30 and is guided to the light emitting face 30b thereof. The light guide 30 is fabricated by forming an acrylic plate or other such light transmitting material so as to have a linear light receiving face 30a facing the main scanning line on the stimulable phosphor sheet 14 and a ring-like light emitting face 30b. The light emitting face 30b is coupled with the light receiving face of a photomultiplier 32 via an optical filter 31 which passes the light 29 and cuts the laser light 24. The light 29 entering the light guide 30 through the light receiving face 30a advances through the interior of the light guide 30 by repeated total reflection and then exits from the light emitting face 30b and passes through the optical filter 31 into the photomultiplier 32. The photomultiplier 32 converts the light 29 carrying the X-ray image into an analog electric signal $S_A$.

The signal $S_A$ output by the photomultiplier 32 is sent to a logarithmic amplifier 33 where it is logarithmically amplified and then to an A/D converter 34 for conversion into a digital image signal $S_D$.

The image signal $S_D$ is forwarded to a signal processing section 40 including a main unit 41 having an internal CPU (central processing unit) and memory, a disk drive section 42 for insertion of floppy disks to serve as auxiliary memory, a keyboard 43 through which an operator can input required instructions to the X-ray image recording section and a CRT display 44 for displaying a visible image based on the image signal $S_D$ and other required information. The signal processing section 40 is one example of the control means of the present invention.

The image signal $S_D$ input to the signal processing section 40 can, if necessary, be data compressed and stored in an image filing unit (not shown) as an image signal representing a radiation image. Alternatively, it can be subjected to imaging processing, e.g. frequency processing and gradation processing, and reproduced as a visible image on the CRT display 44.

As was mentioned earlier, the information represented by the bar code 51 is read from the stimulable phosphor sheet 14 before it is set at the prescribed position in the X-ray image read-out section 20. The type of the stimulable phosphor sheet 14 is discriminated from this information and, based on this discrimination, certain adjustments as will be described in the following are made in connection with the read-out.

FIG. 1 is a graph showing the relationship between the amount of stimulating light projected per unit area onto different types of stimulable phosphor sheets which had in advance been exposed to identical amounts of X-ray energy and the amount of light emitted by the stimulable phosphor sheets.

Consider two stimulable phosphor sheets, one of type A and the other of type B, which have been exposed to the same amount of X-ray energy. When an amount E of stimulating light is projected onto each of these sheets the type A sheet will emit an amount of light A while the type B sheet will emit an amount of light B which is different from the amount of light A. In other words, each type of stimulable phosphor sheet has its own characteristics. The characteristics of the different types of stimulable phosphor sheets to be used are determined in advance and stored in the signal processing section 40.

The bar code 51 is read by the bar code reader 52 and a signal $S_{BC}$ representing bar code information is input to the signal processing section 40. After discriminating the type of the stimulable phosphor sheet based on this information, the signal processing section 40 controls a high-voltage power supply 35 with reference to characteristics such as those shown in FIG. 1 that have been stored for the type of stimulable phosphor sheet set in the X-ray image read-out section 20. This control is conducted so as to regulate the voltage $H_v$ applied to the photomultiplier 32 by the high-voltage power supply 35 in such manner as to obtain an image signal of the same level irrespective of whether the image signal is produced from a light amount A obtained by reading out a type A stimulable phosphor sheet or from a light amount B obtained by reading out a type B stimulable phosphor sheet. As a result, an image signal of the same level is obtained regardless of whether the stimulable phosphor sheet being read is of type A or type B.

Instead of controlling the voltage $H_v$ applied to the photomultiplier 32, the same result can be obtained by regulating the luminous energy of the laser beam 24. More specifically, where an image signal $S_A$ of appropriate level is obtained from the amount of light A emitted by a type A stimulable phosphor sheet scanned with a laser beam 24 of light amount E, it is possible to obtain an image signal $S_B$ of the same level from a type B stimulable phosphor sheet by reducing the luminous energy of the laser beam 24 to an amount of light E' which will cause the type B sheet to emit the same amount of light A.

It is alternatively possible to regulate the amount of stimulating light projected onto the stimulable phosphor sheet in other ways than by regulating the luminous energy of the laser beam 24. For example, the amount of light projected onto the stimulable phosphor sheet per pixel can instead be regulated by controlling the speed of rotation of the polygonal mirror 26 (the main scanning speed) and/or by controlling the speed of conveyance of the stimulable phosphor sheet 14 (the subscanning speed).

It is further possible to regulate the amount of the laser light 24 projected onto the stimulable phosphor sheet to the value E'' shown in FIG. 1 by adjusting either the luminous energy of the laser beam 24 or the scanning speed and adjusting the voltage $H_v$ applied to the photomultiplier 32 by an amount corresponding to the difference between the emitted light amount A and emitted light amount B'.

It should be noted that the discrimination of the type of stimulable phosphor sheet using the information represented by the bar code 51 in the embodiments described above is only one example. The discrimination can alternatively be conducted in any of various other ways such as by inputting sheet type information through the keyboard 43 each time a sheet is set in the X-ray image read-out section 20.

Nor is the radiation image to be read out by the apparatus according to the invention limited to the X-ray image discussed in the foregoing. The apparatus is also applicable to read-out of other types of images and, specifically, can be used in an electron microscope system for read-out of images recorded on stimulable phosphor sheets by an electron beam.

Another embodiment of the radiation image read-out apparatus according to the present invention will now be described with reference to the perspective view of FIG. 4, which illustrates an X-ray image read-out apparatus that is an embodiment of the present invention.

Figure 2:
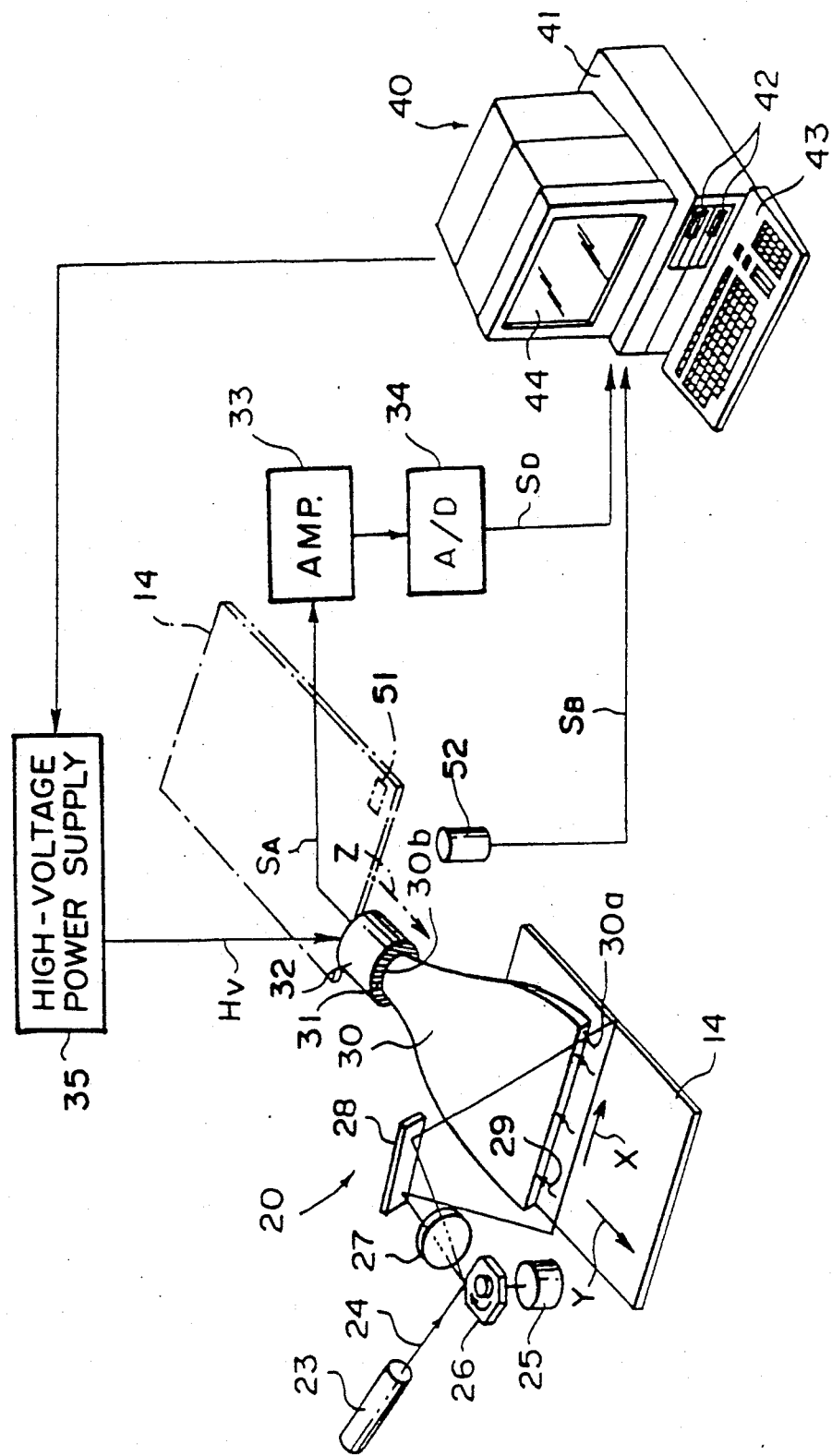
FIG. 2 is a perspective view of an X-ray image read-out apparatus according to one embodiment of the present invention.

Constituent elements that are the same as or similar to those in FIG. 2 are assigned like reference symbols to those in FIG. 2 and will not be discussed further here.

An X-ray image is read out from the stimulable phosphor sheet 14 in the X-ray image read-out section 20 by the same method as explained earlier. The emitted light 29 carrying the X-ray image information is converted to an electric signal by the photomultiplier 32. The bleeder voltage of the photomultiplier 32 is monitored during the read-out operation and a signal $S_A$ representing this voltage is input to the signal processing section 40.

Downstream of the X-ray image read-out section 20 relative to the direction of conveyance of the stimulable phosphor sheet 14 there is provided an erasing light source 37 for erasing any X-ray energy (residual image) that was not released by the scanning with the laser beam 24 during read-out. The erasing light source 37 is connected with a power supply 36 which regulates the voltage applied thereto (thus regulating the amount of erasing light emitted) in accordance with instructions received from the signal processing section 40.

This control of the voltage supplied to the erasing light source 37 will now be explained.

Figure 3A:
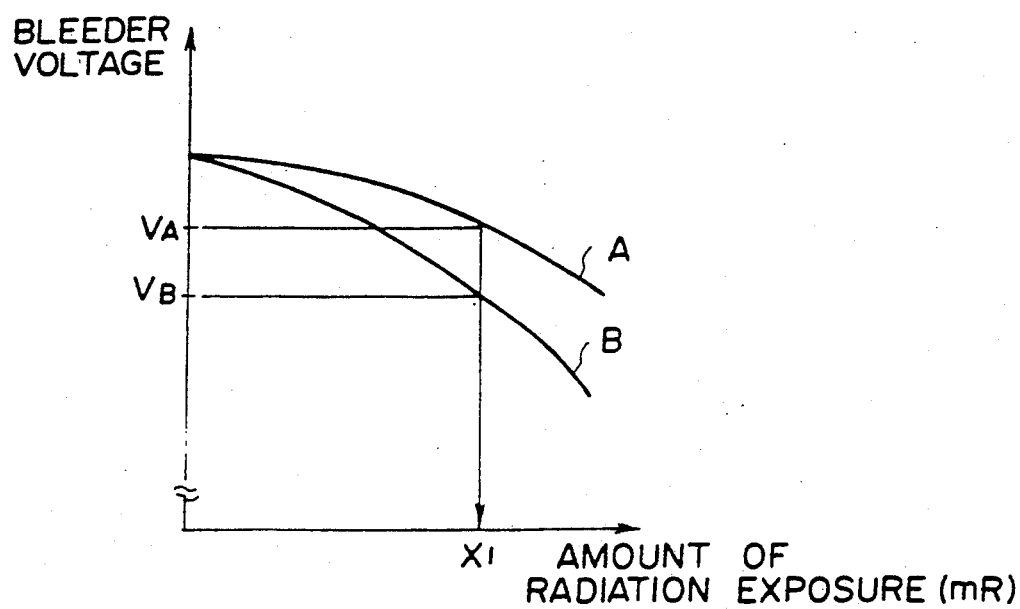
FIG. 3A is a graph showing the relationship between the bleeder voltage of a photomultiplier during stimulable phosphor sheet read-out and the amount of X-ray energy to which a stimulable phosphor sheet was exposed during imaging recording.

The graph in FIG. 3A shows the relationship between the photomultiplier bleeder voltage and the amount of X-ray energy to which the stimulable phosphor sheet was exposed during imaging recording.

Figure 3B:
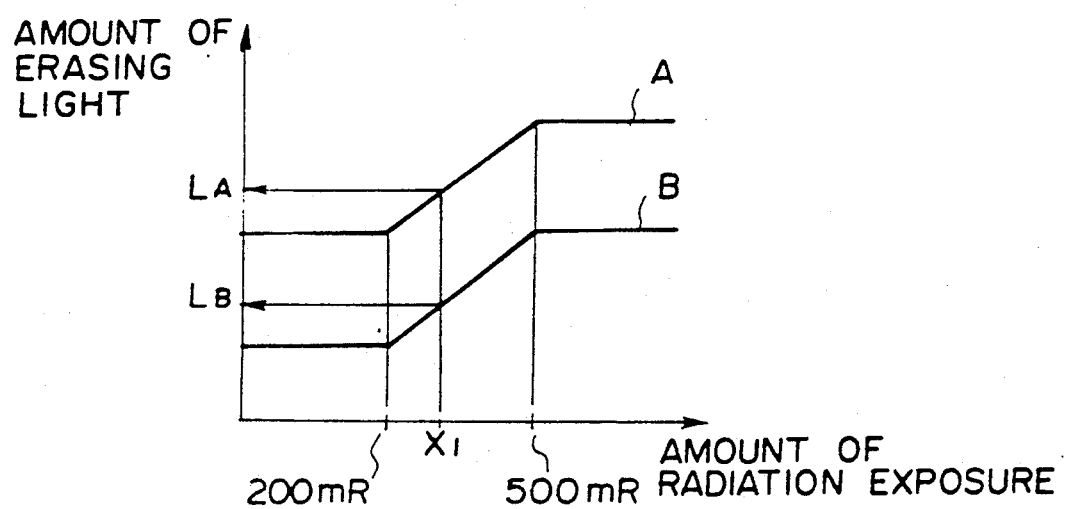
FIG. 3B is a graph showing the relationship between the amount of X-ray energy to which a stimulable phosphor sheet was exposed during imaging recording and the amount of erasing light required for erasing the residual image after read-out under prescribed conditions.

The graph in FIG. 3B shows the relationship between the amount of X-ray energy to which a stimulable phosphor sheet was exposed during imaging recording and the amount of erasing light required for erasing the residual image after read-out under prescribed conditions.

These relationships between the amount of exposure to X-ray radiation and the bleeder voltage and between the amount of exposure to X-ray radiation and the required amount of erasing light are determined in advance for a plurality of sheet types A, B ... and stored in the signal processing section 40.

The larger is the amount of X-ray energy to which the sheet is exposed, the larger is the amount of emitted light received by the photomultiplier 32 during read-out and, consequently, the smaller is the bleeder voltage. Thus, by monitoring the bleeder voltage during read-out, it is possible to detect the amount of radiation to which the stimulable phosphor sheet was exposed (the amount of X-ray energy stored thereby). (See U.S. Pat. No. 4,687,937.) However, in the case of using stimulable phosphor sheets of different types (e.g. one of type A and one of type B), the amount of light emitted by the sheets will differ during read out even if they were exposed to the same amount of X-ray energy during image recording and exposed to the same amount of stimulating light 24 during read-out. Thus, as shown in FIG. 3A, the bleeder voltage will differ between the two sheets for one and the same X-ray exposure amount $X_1$.

Assume that the minimum value to which the bleeder voltage falls during read-out of a type A stimulable phosphor sheet is $V_A$. In this case, since the type of the stimulator phosphor sheet has already been discriminated from the bar code 51 information, the signal processing section 40 can refer to stored information similar to that shown in FIG. 3A regarding the relationship between the amount of exposure to X-ray energy and the bleeder voltage for the type of sheet concerned and, based on this information and the signal $S_{BL}$ indicating the bleeder voltage which it receives, can determine the maximum X-ray radiation exposure $X_1$.

The signal processing section 40 then refers to stored information like that shown in FIG. 3B regarding the relationship between the amount of X-ray radiation exposure and the amount of erasing light required and, based on the maximum X-ray radiation exposure value $X_1$ just determined, obtains the required amount of erasing light $L_A$. The signal processing section 40 then sends a control signal $S_C$ to the power supply 36 so as to cause the erasing light source 37 to emit an amount of erasing light corresponding to the calculated amount of erasing light $L_A$.

The type B stimulable phosphor sheet is treated in the same manner. Specifically, the maximum amount of X-ray energy $X_1$ to which the sheet was exposed during image recording is found from the minimum value $V_B$ to which the bleeder voltage falls during read out and the so-determined value is used to find the required amount of erasing light $L_B$, whereafter the erasing light source 37 is controlled to a brightness corresponding to the calculated amount of erasing light $L_B$ during the erasing operation.

In the arrangement just described the speed of conveyance of the stimulable phosphor sheet 14 is maintained constant and the amount of erasing light to which the sheet is exposed is regulated by controlling the light output of the erasing light source 37. Alternatively, it is possible to regulate the speed of sheet conveyance.

Further, rather than erasing the sheet while it is being conveyed, it is possible to project erasing light simultaneously onto the entire surface of the sheet after it has been read out. In this case, the amount of exposure to erasing light is regulated by controlling either the output of the erasing light source or the exposure time.

While in the foregoing embodiments the amount of erasing light is controlled relative to the amount of X-ray energy stored in the individual sheets of different types, the invention is not limited to this arrangement. Instead it is possible to determine the amount of erasing light that is ordinarily adequate for each type of sheet on the basis of experience or through tests and to control the amount of exposure to erasing light solely on the basis of sheet type, without reference to the amount of radiation energy stored in the sheets. In this case, the erasing apparatus can be an independent unit from the radiation image read-out apparatus.

I claim:
1. A radiation image read-out apparatus comprising:
   scanning means for two-dimensionally scanning stimulable phosphor sheets each carrying a radiation image thereon with a beam of stimulating light,
   read-out means for photoelectrically detecting light emitted from the stimulable phosphor sheet scanned with the stimulating light and producing an electric image signal carrying the radiation image,
   means for discriminating different types of stimulable phosphor sheets,
   means for regulating the amount of the stimulating light projected onto the stimulable phosphor sheet per unit area thereof during scanning with the beam of stimulating light, and
   control means responsive to an output of the stimulable phosphor sheet discriminating means for controlling the light amount regulation means to cause different types of stimulable phosphor sheets having radiation images recorded thereon under the same conditions to emit the same amount of light.

2. A second radiation image read-out apparatus comprising:
   scanning means for two-dimensionally scanning stimulable phosphor sheets each carrying a radiation image thereon with a beam of stimulating light,
   read-out means for photoelectrically detecting light emitted from the stimulable phosphor sheet scanned with the stimulating light and producing an electric image signal carrying the radiation image,
   means for discriminating different types of stimulable phosphor sheets,
   means for regulating a photoelectric conversion gain of the read-out means, and
   control means responsive to an output of the stimulable phosphor sheet discriminating means for controlling the photoelectric conversion gain regulation means to cause the read-out means to produce identical image signals in response to different amounts of light emitted by different types of stimulable phosphor sheets having radiation images recorded thereon under the same conditions.

3. A radiation image read-out apparatus comprising:
scanning means for two-dimensionally scanning stimulable phosphor sheets each carrying a radiation image thereon with a beam of stimulating light,
read-out means for photoelectrically detecting light emitted from the stimulable phosphor sheet scanned with the stimulating light and producing an electric image signal carrying the radiation image,
means for discriminating different types of stimulable phosphor sheets,
means for regulating the amount of the stimulating light projected onto the stimulable phosphor sheet per unit area thereof during scanning with the beam of stimulating light,
means for regulating a photoelectric conversion gain of the read-out means, and
control means responsive to an output of the stimulable phosphor sheet discriminating means for controlling the light amount regulation means and the photoelectric conversion gain regulation means to cause the read-out means to produce identical image signals in response to different amounts of light emitted by different types of stimulable phosphor sheets having radiation images recorded thereon under the same conditions.

4. A stimulable phosphor sheet erasing apparatus for erasing any residual radiation image present on a stimulable phosphor sheet by projecting erasing light onto the sheet, comprising means for discriminating different types of stimulable phosphor sheets differing in erasability and means responsive to the output of the discriminating means for controlling the amount of the erasing light projected onto the stimulable phosphor sheet thereof.

5. A radiation image read-out apparatus comprising:
scanning means for two-dimensionally scanning stimulable phosphor sheets each carrying a radiation image thereon with a beam of stimulating light,
read-out means for photoelectrically detecting light emitted from the stimulable phosphor sheet scanned with the stimulating light and producing an electric image signal carrying the radiation image,
means for erasing any residual radiation image present on the stimulable phosphor sheet by projecting erasing light onto the portion of the stimulable phosphor sheet for which read-out has been completed,
means for discriminating different types of stimulable phosphor sheets differing in erasability,
means for detecting the radiation energy level stored by the stimulable phosphor sheet at the time the read-out means photoelectrically detects the light emitted thereby, and
means responsive to the output of the discriminating means and the output of the radiation energy level detecting means for controlling the amount of the erasing light projected onto the stimulable phosphor sheet thereof.

* * * * *